G. S. MELCHER.
FEED PRESSURE REGULATOR.
APPLICATION FILED DEC. 2, 1914.
1,155,076.
Patented Sept. 28, 1915.
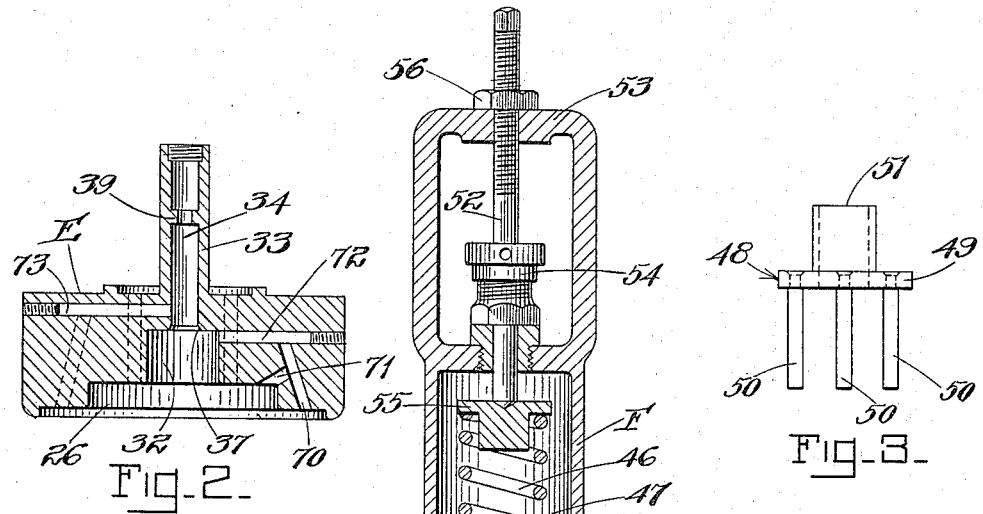
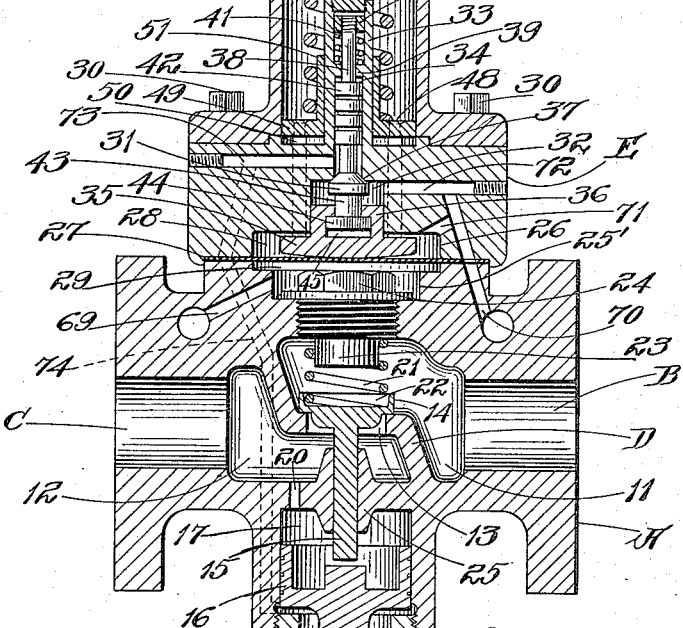
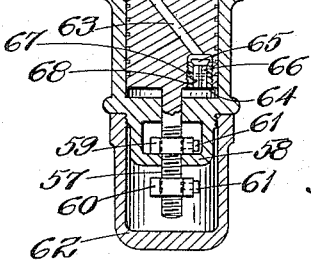
WITNESSES:
INVENTOR:
George S. Melcher
Attys

UNITED STATES PATENT OFFICE.

GEORGE S. MELCHER, OF SHARON, MASSACHUSETTS, ASSIGNOR TO CHARLES W. McCONNEL, OF BOSTON, MASSACHUSETTS, ELDON MACLEOD, OF WESTWOOD, MASSACHUSETTS, AND FANNIE B. LOOK, OF NORTHAMPTON, MASSACHUSETTS, TRUSTEES, DOING BUSINESS UNDER THE NAME OF THE MASON REGULATOR COMPANY.

FEED-PRESSURE REGULATOR.

1,155,076.      Specification of Letters Patent.      Patented Sept. 28, 1915.

Application filed December 2, 1914. Serial No. 875,180.

*To all whom it may concern:*

Be it known that I, GEORGE S. MELCHER, a citizen of the United States, residing at Sharon, county of Norfolk, State of Massachusetts, have invented a certain new and useful Improvement in Feed-Pressure Regulators, of which the following is a specification, reference being had therein to the accompanying drawings.

My invention has for its object the production of a new and improved excess pressure regulator which is particularly designed to maintain a predetermined excess of pressure in the boiler feed line above that in the boiler regardless of the variations in the boiler pressure. My device belongs to the class of pressure regulators which are controlled by a diaphragm having the feed line pressure on one side and the boiler pressure on the other side. Heretofore so far as known to me practically all devices of this type are what may be termed direct operated devices, that is, the main valve is positively connected to the diaphragm. In such devices therefore the amount of movement of the main valve is dependent entirely upon the amount of movement of the diaphragm. This construction practically eliminates the use of a metal diaphragm and necessitates the use of a diaphragm of rubber or other equally flexible material in order to obtain the amount of movement necessary for the valve. The rubber diaphragm will not stand any great amount of heat and therefore is necessarily located at some distance from the main valve through which the hot steam passes and arranged to operate in some cooling fluid such as water or the like. I have found, however, that in many instances rubber diaphragms, even when properly protected, will not give satisfactory results for although they possess relatively great flexibility there is still not sufficient movement to be adequate under many circumstances. Where the initial pressure and the consumption of steam required are substantially constant a direct operated valve is substantially satisfactory but where the initial pressure varies which causes a corresponding variation in the load on the pressure pump the direct operated valve will not have sufficient movement to take care of the steam necessary to operate the pump to prevent fluctuation. Further, in cases where a large valve is necessary to take care of the volume of steam required, I have found that direct operated valves are not practical. Again, the pressure essential to move a large valve, even where a balanced valve is employed, is sufficient to destroy the necessary balance of the pressures on both sides of the diaphragm, thus resulting in more or less fluctuation, the elimination of which is one of the main objects for which these valves are designed.

My object is to construct an excess feed pressure regulator in which an auxiliary valve is employed to control the main valve. This allows the use of a metal diaphragm which is not affected by heat and gives the main valve the opening desired. For this reason and for the reason that the balanced pressures are not affected owing to the fact that a very small auxiliary valve may be employed the auxiliary operated device reduces the fluctuation of the feed pressure to a minimum. Heretofore so far as known to me, there has never been an auxiliary operated feed pressure regulator having a single diaphragm.

I am aware that a pair of diaphragms having a washer interposed between them have been employed. Such devices have not been found satisfactory for they cannot be regulated without changing the washer between the diaphragms which makes it essential to take apart the device. The interposition of a washer between two diaphragms results in an exposed area on the inner faces of each of the diaphragms surrounding the washer. The outer portion of each of the diaphragms is therefore subjected to a heavy pressure on one side only which strains the diaphragms severely and results in early breakage.

The device embodied in my invention is so arranged that a single diaphragm may be employed which is subjected to pressure on both sides so that there is no exposed area and at the same time so constructed that the excess pressure desired may be readily determined by an adjustment on the exterior of the device.

My invention will be fully understood from the following description taken in connection with the accompanying drawings and the novel features thereof will be pointed out and clearly defined in the claims at the close of the specification.

In the drawings, Figure 1 is a sectional view of an excess feed pressure regulator embodying my invention. Fig. 2 is a sectional view of the auxiliary valve containing member. Fig. 3 is a view of the cricket employed in my device.

Having reference to the drawings and particularly to Fig. 1, there is shown at A the main body of the valve having the usual inlet and outlet openings B and C adapted to be connected to the steam pipes leading from the boiler and to the pump respectively. They are separated by a partition D which divides the valve body into inlet and outlet chambers 11 and 12. An opening 13 through the partition connecting the chambers is controlled by a valve 14 which has a seat on the upper side of the partition D. The valve has a stem 15 which is adapted to reciprocate in a guide 25 and extends downwardly to a point shortly above a piston 16 operating in the chamber 17 in the lower portion of the valve body A. Combined with the piston 16 is a dash pot piston 18 which is located in a dash pot 19 and operates to retard the movement of the piston 16. A port 20 connects the outlet chamber 12 with the chamber 17 and thus permits the pressure in the outlet chamber to operate on the upper side of the piston 16. I provide a spring 21 above the valve 14 which causes the valve to follow the movement of the piston 16. The lower end of the spring rests in a pocket 22 in the valve and its upper end surrounds a stud or guide 23 on the lower end of a nut 24 threaded into the valve body. While I have described in detail the form of main valve employed I wish it to be understood that I do not desire to limit myself to this exact form of construction.

The valve body A is provided on its upper side with an auxiliary valve containing member E which in turn carries a spring case F. The valve body A is recessed as shown at 25' which corresponds to a recess 26 in the member E. A metal diaphragm 27 of usual form is contained between the edges of the member E and valve body and divides the space formed by the combined recesses into the chambers 28 and 29. Bolts 30 secure the members E and F and the interposed diaphragm firmly in place.

The member E which is most clearly shown in Fig. 2 is so constructed that it completely incloses the auxiliary valve 31 which controls the main valve in a manner hereinafter to be described. It is provided with a recess 32 which opens into the upper wall of the chamber 28 and with an integral tubular extension 33. The opening 34 in the extension 33 extends downwardly to the upper surface of the recess 32. A button 35 having a portion 36 making a sliding fit with the lower part of the recess 32 in the member E rests on the diaphragm 27. The upper part of this recess 32 forms a valve chamber in which the valve 31 is located which has a seat in the flaring end 37 of the opening 34. A stem 38 with which the valve is provided passes through a guide 39 and carries on its upper end a head or plunger 40. A spring 41 which surrounds the stem between the head 40 and guide 39 tends to seat the valve 31. The lower end of the stem 38 is also provided with an enlarged cylindrical portion 42 slidably fixed within the opening 34 to aid in guiding the valve and securing the proper seating of the same. A stem 43 is secured to the lower end of the valve 31 and is provided with a T-head 44 which loosely fits within a chamber 45 in the portion 36 of the button 35. The chamber 45 is slightly deeper than the head 44 as shown. This construction permits the spring to close the valve 31 when the button 35 is moved upwardly by the diaphragm 27, the T-head 44 operating to open the valve when the diaphragm and button are moved downwardly. I regard this construction as important for it enables the upward movement of the diaphragm to be limited after the auxiliary valve is closed. This removes the strain from the valve seat and the tendency to cramp it as would result if the button was rigidly connected with the valve, and the seating of the valve was the limit for the upward movement of the diaphragm.

The required movement to close the valve 31 is effected by the button acted upon by the pressure beneath the diaphragm 27 in a manner hereinafter to be described. In order to open the valve I provide a cricket which is operated by an excess pressure spring 46 in the chamber 47 in the member F. This spring coöperates with pressure above the diaphragm to withstand pressure beneath the diaphragm in a manner to be set forth. The cricket 48 as shown in Fig. 3 consists of a flange 49 mounted on legs 50 the flange being provided with a collar or barrel portion 51. The legs are preferably three in number and are secured to the flange in tri-cornered fashion. They are adapted to be received in holes correspondingly positioned which extend vertically through the member E as shown in Fig. 1, the legs being of such length that they rest upon the button 35 and retain the flange 49 of the cricket slightly above the upper surface of the member E. It will be seen that the cricket thus spans the auxiliary valve 31 and transmits the pressure of the spring 46 to the button 35. This cricket construction is most important for it enables the excess pressure spring to be placed in a position in the valve where it may be readily adjusted.

This is essential for it allows the use of a single diaphragm at the same time enabling the excess pressure to be readily adjusted as desired.

The adjusting mechanism consists of an adjusting screw 52 having a threaded upper end passing through the correspondingly threaded bracket 53. The lower end of the adjusting screw passes through a stuffing box 54 of common form and construction and bears against a stud 55 on the upper end of the excess pressure spring 46. A squared upper end on the screw 52 is provided for the reception of a suitable key, a locking nut 56 being also employed.

I find that under certain circumstances it is desirable to limit the opening and closing of the main valve 14. I therefore provide for this purpose a novel adjusting device which is so arranged that the maximum and minimum valve opening may be readily controlled. For this purpose I provide the dash pot piston 18 with a downwardly extending rod 57 which passes through the end of the dash pot and makes a relatively tight sliding fit therewith. A bracket 58 is provided on the end of the dash pot through a hole in which the rod projects, as shown. The lower end of the rod is threaded and the hole referred to is of sufficient size to permit the threaded end of the rod to be freely movable relatively to the bracket. A pair of nuts 59, 60 located on the rod, one on each side of the bracket, act as stops to limit the movement of the rod and consequently that of the piston and valve 14. Set screws 61 are provided which operate to retain the nuts in the position desired. In order to prevent pressure in the dash pot cylinder which leaks past the rod from escaping I provide a removable cup-shaped cap 62 which may be readily detached in order to get at the adjusting mechanism.

The auxiliary valve construction herein above described is particularly adapted to enable the use of a dash pot piston in combination with the main valve operating piston which acts as a retarding and steadying force on the action of the main valve and thus prevents it from closing or opening too quickly. The retarding effect is particularly desirable while the valve is being opened for it prevents a too rapid introduction of steam to the pump. In order to permit the valve to shut quickly and cause it to open slowly, I provide a check valve in a port 63 running through the dash pot piston. The lower end of the port is enlarged as shown and threaded to receive a correspondingly threaded tubular member 64 having a beveled upper end which forms a seat for the valve 65. The valve 65 has a stem 66 which passes through the tubular member 64, the stem being secured in place by a cross-pin 67 which passes through an elongated slot 68 in the valve stem thereby giving the valve sufficient movement to be cracked off its seat.

The diaphragm 27 is acted upon by the feed line pressure which is admitted to the chamber 29 through a port 69 and by the boiler pressure admitted to the upper chamber 28 by the ports 70 and 71. The boiler pressure is also admitted by way of ports 70 and 72 to the chamber formed by the recess 32 so that when the auxiliary valve 31 opens the pressure is allowed to pass by way of the ports 73 and 74 beneath the piston 16. The excess pressure spring 46 coöperates with the boiler pressure and presses downwardly on the diaphragm 27 by means of the cricket construction described with a pressure determined by the adjusting screw 52. When the feed line pressure below the diaphragm equals the boiler pressure and the spring pressure above the diaphragm, the diaphragm will be held in its normal or horizontal position inasmuch as the pressures are balanced. If, however, the feed line pressure becomes less than the boiler pressure and spring pressure the diaphragm will be depressed which will open the valve 31 allowing steam to pass from the port 72 around the valve 31 and thence beneath the piston 16 by way of the ports 73 and 74. This will in turn raise the valve 14 permitting steam to pass to the pump. The opening of the main valve is retarded by the dash pot piston which makes a slow leaking fit with the dash pot cylinder. The steam thus introduced to the pump increases the feed line pressure and raises the diaphragm 27 permitting the auxiliary valve to be closed by the light spring 41 and the pressure beneath its head which prevents further passage of steam to the piston 16. Under these circumstances the pressure beneath the piston 16 will leak past it to the upper side and the pressure beneath the dash pot piston is permitted to pass from under it by way of the check valve. The pressure below the pistons being thus relieved they will be forced downwardly by the pressure in the low pressure chamber 12 which is transmitted to the upper side of the piston 16 by way of the port 20 allowing the main valve 14 to close.

I regard my invention as important for my device is capable of use under practically any and all conditions. The construction allows the use of a single metal diaphragm in combination with an auxiliary operated main valve and provides for a ready adjustment of the excess pressure. An adequate valve opening is obtained which supplies the necessary volume where large valves are employed or where the initial pressure varies thus preventing the fluctuation of the pressure in the feed line which would otherwise result. The device is therefore adapted to maintain a predetermined non-fluctuating excess pressure in the boiler feed line above the steam pressure in the boiler regardless of variations in the pressure of the latter, or of the volume of pressure required.

What I claim is:

1. An excess feed pressure regulator comprising a body having a single flexible diaphragm which has an exposed pressure area on each side thereof, the exposed area of one side being subjected throughout to feed line pressure and the exposed area of the other side being subjected throughout to initial pressure, an auxiliary valve controlled by the movement of said flexible diaphragm, a main valve controlled by said auxiliary valve, and mechanism coöperating with the initial pressure on said diaphragm for exerting an additional pressure thereon.

2. An excess feed pressure regulator comprising a body having a single flexible diaphragm which has an exposed pressure area on each side thereof, the exposed area of one side being subjected throughout to feed line pressure and the exposed area of the other side being subjected throughout to initial pressure, an auxiliary valve controlled by the movement of said flexible diaphragm, a main valve controlled by said auxiliary valve, mechanism coöperating with the initial pressure on said diaphragm for exerting an additional pressure thereon, and means for regulating the amount of pressure exerted by said additional pressure mechanism.

3. An excess feed pressure regulator comprising a body having a single flexible diaphragm therein, said diaphragm having an exposed area on one side subjected to feed line pressure and an exposed area on the other side subjected to initial pressure, an auxiliary valve operated in one direction by the feed pressure on said diaphragm, a spring coöperating with the initial pressure on the other side of said diaphragm to operate said valve in the other direction, a main valve controlled by said auxiliary valve, and means for regulating the pressure exerted by said spring.

4. An excess feed pressure regulator comprising a body having a flexible diaphragm therein subjected to feed line pressure on one side and to initial pressure on the other side, a main valve, an auxiliary valve, said flexible diaphragm being on one side of said auxiliary valve, pressure mechanism on the other side of said auxiliary valve, and intermediate mechanism by which pressure is transmittted from the pressure mechanism to the diaphragm.

5. An excess feed pressure regulator comprising a body having a flexible diaphragm subjected to feed line pressure on one side and to initial pressure on the other side, a main valve, an auxiliary valve, said flexible diaphragm being on one side of said auxiliary valve, pressure mechanism on the other side of said auxiliary valve, and intermediate mechanism by which pressure is transmitted from the pressure mechanism to the diaphragm, said intermediate mechanism being capable of moving relatively to the auxiliary valve.

6. An excess feed pressure regulator comprising a body having a flexible diaphragm therein subjected to feed line pressure on one side and to initial pressure on the other side, a main valve, an auxiliary valve, an intermediate member engaging said diaphragm and said auxiliary valve, pressure mechanism, and a second intermediate member interposed between said first mentioned intermediate member and said pressure mechanism for transmitting pressure to the diaphragm.

7. An excess feed pressure regulator comprising a body having a flexible diaphragm therein subjected to feed line pressure on one side and to initial pressure on the other side, an auxiliary valve provided with a button resting on one side of said diaphragm, a member spanning said valve and resting on said button, pressure mechanism operating on said valve spanning member, means for regulating the amount of pressure exerted by said pressure mechanism and a main valve operated by said auxiliary valve.

8. An excess feed pressure regulator comprising a body having a diaphragm therein subjected to feed pressure on one side and to initial pressure on the other side, a button resting against one side of said diaphragm, an auxiliary valve connected with said button, a cricket comprising a member having a plurality of legs spanning said valve and resting on said button, a main valve controlled by said auxiliary valve and pressure mechanism operating on said cricket to bring pressure to bear on said button.

9. An excess feed pressure regulator comprising a body having a diaphragm therein subjected to feed pressure on one side and to initial pressure on the other side, a button resting against one side of said diaphragm, an auxiliary valve connected with said button, a cricket comprising a member having a plurality of legs spanning said valve and resting on said button, mechanism for exerting pressure on said cricket, a main valve controlled by said auxiliary valve, and means for regulating the amount of pressure exerted by said pressure mechanism.

10. An excess feed pressure regulator comprising a body having a diaphragm therein subjected to feed line pressure on one side and to initial pressure on the opposite side, an auxiliary valve provided with a button contacting with said diaphragm, a cricket comprising a member having a plurality of legs spanning said auxiliary valve and resting on said button, a spring bearing against said cricket, a main valve controlled by said auxiliary valve and mechanism for regulating the amount of pressure exerted by said spring.

11. An excess feed pressure regulator comprising a body having a diaphragm therein subjected to feed line pressure on one side and to initial pressure on the opposite side, a cricket having a plurality of legs connected with said diaphragm, an adjustable spring bearing against said cricket, an auxiliary valve within said cricket intermediate said spring and said diaphragm, and a main valve controlled by said auxiliary valve.

12. An excess feed pressure regulator comprising a valve body having a main valve therein, an auxiliary valve containing member secured to said body, an auxiliary valve within said member adapted to control said main valve, a diaphragm having feed line pressure on one side and initial pressure on the other side, a cricket having members loosely mounted in said auxiliary valve containing member operated by said diaphragm, mechanism for exerting pressure on said cricket, and means for regulating the amount of pressure exerted by said pressure mechanism.

13. An excess feed pressure regulator comprising a valve body having a main valve therein, an auxiliary valve containing member having an auxiliary valve therein adapted to control said main valve, said valve body and auxiliary valve containing member having oppositely disposed recesses therein forming a chamber, a flexible diaphragm dividing said chamber and having feed pressure on one side and initial pressure on the other side, a button movably mounted in said auxiliary valve containing member connecting with said auxiliary valve and contacting with said diaphragm, a cricket having a plurality of legs extending through said containing member and contacting with said button and pressure mechanism operating on said cricket.

14. An excess feed pressure regulator comprising a body having a diaphragm subjected to feed line pressure on one side and to initial pressure on the opposite side, a button contacting with said diaphragm, an auxiliary valve adapted to be operated by said button in one direction, a spring for operating said valve in the other direction, mechanism operating said button and coöperating with the initial pressure on said diaphragm for exerting an additional pressure thereon, and a main valve controlled by said auxiliary valve.

15. An excess feed pressure regulator comprising a main valve and a containing member therefor, an auxiliary valve and a containing member therefor separate from the main valve container but detachably connected therewith, a single flexible diaphragm interposed between said two valve containers, means for introducing feed pressure on the main valve side of the diaphragm, means for introducing boiler pressure on the auxiliary valve side of the diaphragm, a presser head engaging with said diaphragm on the auxiliary valve side of same, pressure exerting mechanism and a container therefor detachably connected with said auxiliary valve container, and means whereby said pressure exerting mechanism exerts pressure on the said presser head.

16. An excess feed pressure regulator comprising a main valve and a containing member therefor, an auxiliary valve and a containing member therefor separate from the main valve container, but detachably connected therewith, a single flexible diaphragm interposed between said two valve containers, means for introducing feed pressure on the main valve side of the diaphragm, means for introducing boiler pressure on the auxiliary valve side of the diaphragm, a pressure member connected with said auxiliary valve and movable with relation thereto and engaging with said diaphragm, a spring container detachably connected with said auxiliary valve container and separated thereby from the main valve container, a spring in said spring container, a follower engaged by said spring and passing loosely through said auxiliary valve container and acting upon the said pressure member whereby the pressure of said spring is transmitted to the diaphragm.

17. The excess feed pressure regulator comprising a body having a flexible diaphragm which has an exposed pressure area on each side thereof, the exposed area on one side being subjected to feed line pressure and the exposed area on the other side being subjected to initial pressure, an auxiliary valve controlled by the movement of said flexible diaphragm, a main valve controlled by said auxiliary valve, said main and said auxiliary valves being on opposite sides of said diaphragm, and mechanism on the same side of the diaphragm with the said auxiliary valve and coöperating with the initial pressure on said diaphragm for exerting an additional pressure thereon.

In testimony whereof I affix my signature, in presence of two witnesses.

GEORGE S. MELCHER.

Witnesses:
ELDON MACLEOD,
CAMERON MACLEOD.